(12) United States Patent
Kim

(10) Patent No.: US 8,049,469 B2
(45) Date of Patent: Nov. 1, 2011

(54) SAFETY CIRCUIT AND BATTERY PACK USING THE SAME

(75) Inventor: Youngbok Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 598 days.

(21) Appl. No.: 12/237,632

(22) Filed: Sep. 25, 2008

(65) Prior Publication Data

US 2009/0085521 A1  Apr. 2, 2009

(30) Foreign Application Priority Data

Sep. 28, 2007 (KR) .................. 10-2007-0097981

(51) Int. Cl.
*H02J 7/06* (2006.01)
*H02H 5/04* (2006.01)
*H02J 7/00* (2006.01)

(52) U.S. Cl. ........ 320/153; 320/149; 320/155; 320/135; 320/136; 361/27; 361/103; 361/125

(58) Field of Classification Search .................. 320/153
See application file for complete search history.

(56) References Cited

U.S. PATENT DOCUMENTS

| | | | | |
|---|---|---|---|---|
| 5,867,008 | A * | 2/1999 | Du et al. ........................ | 320/136 |
| 6,172,482 | B1 | 1/2001 | Eguchi | |
| 2005/0224911 | A1 | 10/2005 | Sugano | |
| 2006/0076930 | A1 * | 4/2006 | Ooshita et al. ................ | 320/134 |
| 2006/0255768 | A1 * | 11/2006 | Yoshio ......................... | 320/134 |
| 2007/0188148 | A1 * | 8/2007 | Kawasumi et al. ........... | 320/134 |
| 2008/0150488 | A1 * | 6/2008 | Lu et al. ....................... | 320/134 |

FOREIGN PATENT DOCUMENTS

| | | |
|---|---|---|
| CN | 2333138 | 8/1999 |
| CN | 2333138 Y | 8/1999 |
| JP | 2005-302832 | 10/2005 |
| JP | 2006-109596 | 4/2006 |
| KR | 20-1999-0015346 | 5/1999 |
| KR | 10-2000-0001274 A | 1/2000 |
| KR | 10-2004-0064958 A | 7/2004 |
| KR | 10-2005-0034067 A | 4/2005 |
| KR | 10-2005-0061524 | 6/2005 |
| KR | 10-0684239 | 2/2007 |
| KR | 10-0862534 | 10/2008 |

OTHER PUBLICATIONS

SIPO Office Action dated Apr. 22, 2010 of the corresponding Chinese Patent Application No. 200810167128.1, 12 pages.

* cited by examiner

*Primary Examiner* — Edward Tso
*Assistant Examiner* — Yalkew Fantu
(74) *Attorney, Agent, or Firm* — Christie, Parker & Hale, LLP

(57) ABSTRACT

A safety circuit includes a thermal fuse electrically connected in a main current path so that an electric current flowing in the main current path flows through the thermal fuse; a switching element electrically connected to the thermal fuse to cause the thermal fuse to open and interrupt the electric current flowing in the main current path when the switching element is turned on; a microcontroller electrically connected to the switching element and the main current path to turn on the switching element when an overcurrent flows in the main current path; and a noise removing unit electrically connecting the microcontroller to the switching element.

20 Claims, 4 Drawing Sheets

SAFETY CIRCUIT AND BATTERY PACK USING THE SAME

CROSS-REFERENCE TO RELATED APPLICATIONS

This application claims the benefit of Korean Patent Application No. 2007-97981 filed on Sep. 28, 2007, the disclosure of which is incorporated herein by reference in its entirety.

BACKGROUND OF THE INVENTION

1. Field of the Invention

Aspects of invention relate to a safety circuit and a battery pack using the same, and more particularly to a safety circuit that can interrupt a main electric current path in which an electric current being supplied to a load flows, and a battery pack using the same.

2. Description of the Prior Art

A secondary battery can be repeatedly recharged and reused, in contrast to a primary battery that can be charged and used only once. Accordingly, the secondary battery frequently has been used as a main power supply of portable electronic devices for communication, information processing, and reproducing audio/video. The secondary battery is super lightweight and environmentally-friendly, and has a long life, a high energy density, a high output voltage, and a low self-discharge rate. Accordingly, a great deal of attention recently has been focused on the secondary battery, and its development has rapidly progressed.

There are various types of secondary batteries, such as a nickel-hydrogen (Ni-MH) battery and a lithium ion battery, etc., that use different electrode active materials. There are various types of lithium ion batteries, such as a liquid electrolyte battery, a solid polymer electrolyte battery, and a gel phase electrolyte, etc., that use different kinds of electrolytes. Secondary batteries have various types of packages, such as a prismatic type package and a pouch type package, etc.

Typically, a plurality of rechargeable secondary batteries are assembled into a battery pack for use in portable electronic devices, such as a portable computer. A charging/discharging control circuit is provided in the battery pack to control charging/discharging of the battery pack. The charging/discharging control circuit opens or closes a charging/discharging path by turning on or off a switching element to charge or discharge the battery pack. If the switching element is not operated at the proper time during charging/discharging of the battery pack, the battery pack may overheat due to overcharging, or due to an overcurrent caused by an overload or an electrical short in the battery pack, which may cause the battery pack to explode. A safety circuit including a thermal fuse may be provided in the battery pack to prevent this from happening by opening the thermal fuse when overcharging or an overcurrent is detected. However, an RF signal transmitted from a radio set operated near the battery pack may cause the safety circuit to malfunction and prevent the thermal fuse from opening when it should open, or cause the thermal fuse to erroneously open when it should remain closed. If the thermal fuse is prevented from opening when it should open, the battery pack may overheat and possibly explode. If the thermal fuse erroneously opens when it should remain closed, a device powered by the battery pack can no longer be used, thereby inconveniencing a user of the device. If this happens, and the thermal fuse is resettable, the thermal fuse can be reset and the battery pack can continue to be used to power the device. However, if the thermal fuse is non-resettable, it cannot be reset, and the battery pack can no longer be used to power the device, and must be replaced, thereby inconveniencing the user and causing the user to incur the expense of replacing the battery pack, which may be substantial.

SUMMARY OF THE INVENTION

Aspects of the invention relate to a battery pack that can prevent overheating and danger of explosion due to overcharging and overdischarging.

Aspects of the invention also relate to a safety circuit of a battery pack that can prevent an erroneous operation of a thermal fuse caused by reception of an RF signal transmitted from a radio set operated near the battery pack.

According to an aspect of the invention, a safety circuit includes a thermal fuse electrically connected in a main current path so that an electric current flowing in the main current path flows through the thermal fuse; a switching element electrically connected to the thermal fuse to cause the thermal fuse to open and interrupt the electric current flowing in the main current path when the switching element is turned on; a microcontroller electrically connected to the switching element and the main current path to turn on the switching element when an overcurrent flows in the main current path; and a noise removing unit electrically connecting the microcontroller to the switching element.

According to an aspect of the invention, a battery pack using a safety circuit includes a rechargeable battery electrically connected to a main current path; a charging/discharging direction switching element unit electrically connected in the main current path to set a charging/discharging direction of the main current path; a thermal fuse electrically connected in the main current path so that an electric current flowing in the main current path flows through the thermal fuse; a switching element electrically connected to the thermal fuse to cause the thermal fuse to open and interrupt the electric current flowing in the main current path when the switching element is turned on; a protection circuit electrically connected to the rechargeable battery to measure a voltage of the rechargeable battery, and electrically connected to the charging/discharging direction switching unit to control the charging/discharging direction switching unit to set the charging/discharging direction of the main current path, wherein the protection circuit outputs signals providing information about the measured voltage of the rechargeable battery and information about operating conditions of the protection circuit; a microcontroller electrically connected to the protection circuit to receive the signals providing information about the measured voltage of the rechargeable battery and the operating conditions of the protection circuit outputted from the protection circuit, electrically connected to the main current path to measure an amount of the electric current flowing in the main current path, and electrically connected to the switching element to turn on the switching element when an overcurrent flows in the main current path; and a noise removing unit electrically connecting the microcontroller to the switching element.

According to an aspect of the invention, the thermal fuse includes a fuse electrically connected in the main current path so that the electric current flowing in the main current path flows through the fuse; and a heater to heat the fuse when an electric current flows through the heater; and the switching element is electrically connected to the heater to cause an electric current to flow through the heater when the switching element is turned on.

According to an aspect of the invention, the safety circuit or the battery pack further includes a diode electrically connecting the switching element to the thermal fuse to enable a forward current to flow from thermal fuse to the switching element, and to prevent a reverse current from flowing from the switching element to the thermal fuse.

According to an aspect of the invention, the switching element is a field-effect transistor.

According to an aspect of the invention, the safety circuit or the battery pack further includes a resistor electrically connecting a drain of the field-effect transistor to ground to control an amount of electric current flowing through the field-effect transistor to ground.

According to an aspect of the invention, the noise removing unit includes a noise preventing diode electrically connecting the switching element to the microcontroller to enable a forward current to flow from the microcontroller to the switching element, and to prevent a reverse current from flowing from the switching element to the microcontroller.

According to an aspect of the invention, the noise preventing diode is a Schottky diode.

According to an aspect of the invention, a length of a printed circuit pattern electrically connecting the noise preventing diode to the microcontroller is in a range of 0.5 to 3 mm.

According to an aspect of the invention, the safety circuit or the battery pack further includes a damping resistor electrically connecting the switching element to the noise preventing diode.

According to an aspect of the invention, a power consumption of the damping resistor is in a range of ½ to ¹⁄₁₆ W.

According to an aspect of the invention, a safety circuit includes a thermal fuse electrically connected in a main current path so that an electric current flowing in the main current path flows through the thermal fuse; a switching element electrically connected to the thermal fuse to cause the thermal fuse to open and interrupt the electric current flowing in the main current path; a microcontroller electrically connected to the main current path to measure an amount of the current flowing in the main current path, and output a control signal to turn the switching element on when an overcurrent flows in the main current path; and a noise removing unit electrically connecting the microcontroller to the switching element to receive the control signal outputted from the microcontroller, remove noise generated by the microcontroller from the control signal to obtain a noise-free control signal to prevent the noise from causing an erroneous operation of the switching element, and output the noise-free control signal to the switching element to turn the switching element on.

According to an aspect of the invention, the safety circuit further includes a printed circuit electrically connecting the noise removing unit to the microcontroller to transmit the control signal outputted from the microcontroller to the noise removing unit; wherein the printed circuit pattern acts as an antenna to receive an RF signal generated by a radio set operated near the safety circuit, thereby generating RF noise in the control signal transmitted by the printed circuit pattern; and the noise removing unit removes the RF noise from the control signal to obtain the noise-free control signal to prevent the RF noise from causing an erroneous operation of the switching element.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
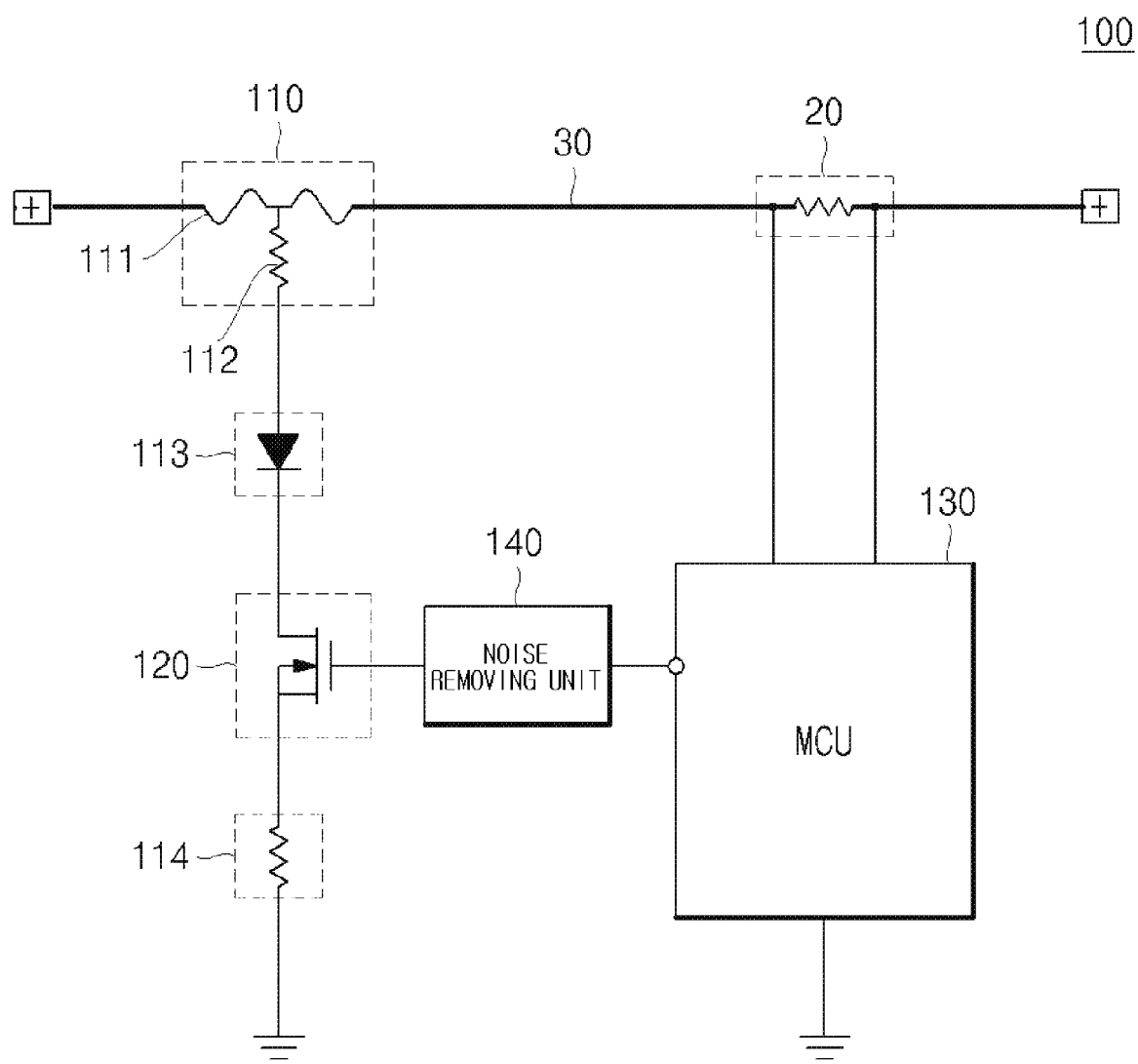
FIG. 1 is a circuit diagram of a safety circuit according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

In the following description, when a first element is described as being "connected to" a second element, it is understood that the first element may be directly connected to the second element without any intervening elements therebetween, or may be indirectly connected to the second element through one or more intervening elements. Also, when a first element is described as "connecting" a second element to a third element, it is understood that the first element may be directly connected to the second element and the third element without any intervening elements therebetween, or may be indirectly connected to the second element and the third element through one or more intervening elements.

FIG. 1 is a circuit diagram of a safety circuit according to an aspect of the invention. Referring to FIG. 1, a safety circuit 100 includes a thermal fuse 110, a switching element 120, a microcontroller 130 (MCU), and a noise removing unit 140.

The thermal fuse 110 is electrically connected in a main current path 30. The thermal fuse 110 includes a fuse 111 that interrupts an electric current by increasing its internal resistance to a substantially infinite value or by melting when a critical temperature of the fuse 111 is reached, and a heater 112 to heat the fuse 111. The fuse 111 may be a resettable fuse or a non-resettable fuse. A fuse 111 that increases it internal resistance to a substantially infinite value when it reaches the critical temperature is an example of the resettable fuse. A fuse 111 that melts when it reaches the critical temperature is an example of the non-resettable fuse. The resettable fuse may be implemented by a positive thermal coefficient thermistor, etc., that interrupts the electric current by increasing its resistance value to a substantially infinite value due to heating of the heater 112, and allows the electric current to flow by decreasing its resistance value a temperature thereof decreases. The non-resettable fuse may be implemented by a lead wire or a ceramic type fuse, etc., that interrupts the electric current by melting when the electric current flow exceeds a critical value of the electric current. The main current path 30 in which the fuse 111 is connected may be a main current path through which a battery is charged or discharged, and/or a main current path through which electric power is to supplied to a load, such as a portable electronic device. For example, a battery may be connected to the left terminal labeled "+" in FIG. 1, and a load may be connected to the right terminal labeled "+" in FIG. 1.

The switching element 120 is electrically connected to the heater 112 of the thermal fuse 110, and is turned on by a signal outputted from the microcontroller 130 to heat the heater 112 to open the fuse 111 of the thermal fuse 110.

The microcontroller 130 is electrically connected to the main current path 30 to measure an electric current flowing in the main current path 30, and output a signal to the switching element 120 electrically connected to the microcontroller 130 to turn on the switching element 120 when the electric current is over a specific critical value. More specifically, the microcontroller 130 measures the electric current by measuring a voltage across a sensing resistor 20 connected in the main current path 30, since the voltage across the sensing resistor 20 is proportional to the current flowing through the sensing resistor 20, which is the current flowing in the main current path 30. When the microcontroller 130 detects an overcurrent flowing in the main current path 30, the microcontroller 130 electrically connected to the switching element 120 turns on the switching element 120 so that an electric current flows in the heater 111 of the thermal fuse 110 until the fuse 111 of the thermal fuse 110 overheats and opens, thereby interrupting the overcurrent flowing in the main current path 30.

Although measuring the voltage across the sensing resistor 20 has been described as one example of a method of measuring the electric current flowing in the main current path 30, it is understood that the invention is not limited to this method, and that other methods of measuring the electric current by the microcontroller 130 may be used.

The noise removing unit 140 electrically connects the microcontroller 130 to the switching element 120. When the switching element 120 is turned on by a signal outputted from the microcontroller 130 to heat the heater 111 of the thermal fuse 110, the noise removing unit 140 removes noise in a signal outputted from the microcontroller 130 to prevent the noise from interfering with the proper operation of the switching element 120. Also, the switching element 120 may be connected to the microcontroller 130 by a printed circuit pattern that may act as an antenna capable of receiving an external RF signal. If a radio set is operated to transmit an RF signal while the radio set is near the safety circuit, the printed circuit pattern may receive the RF signal and generate noise. The noise removing unit 140 also removes this noise to prevent the noise from interfering with the proper operation of the switching unit 120. The noise generated by the microcontroller 130 and the printed circuit pattern may prevent the switching element 120 from turning on or off when instructed to do so by the microcontroller 130, or may cause the switching element to turn on when it should be off, or turn off when it should be on, and the noise removing unit 140 removes the noise to prevent this from happening. The noise removing unit 140 may be implemented by a passive filter using passive elements such as a capacitor and a resistor, etc., or by an active filter using an active element and one or more passive elements, and may be implemented as a discrete circuit using the passive elements, or the active element and the one or more passive elements, or as an integrated circuit, such as a constant voltage IC having a constant current function.

A diode 113 for preventing a reverse current electrically connects the switching element 120 to the heater 112 to allow a forward current to flow from the heater 112 to the switching element 120, and is connected to a drain of the switching element 120 if the switching element 120 is implemented by a field-effect transistor. The diode 113 for preventing the reverse current prevents an electric current from flowing from the switching element 120 to the heater 112 to prevent improper operation of the heater 112.

The switching element 120 may be implemented by a field-effect transistor, a bipolar transistor, or any other suitable switching element. When the switching element 120 is implemented by a field-effect transistor, such as an N-channel MOSFET as shown in FIG. 1, or any other suitable field-effect transistor, a gate of the switching element 120 is electrically connected to the noise removing unit 140, and noise in a signal outputted from the microcontroller 130 and noise generated by a printed circuit pattern connecting the microcontroller 130 to the switching element 120 is removed by the noise removing unit 140 to prevent the noise from being inputted to the gate of the switching element 120 and interfering with the operation of the switching element 120.

A source of the switching element 120 is electrically connected to ground through a resistor 114. The resistor 114 controls an electric current flowing through the switching element 120, and thus controls the electric current flowing through the heater 112. Thus, an amount of current flowing through the heater 112 can be adjusted by adjusting a resistance value of the resistor 114.

Figure 2:
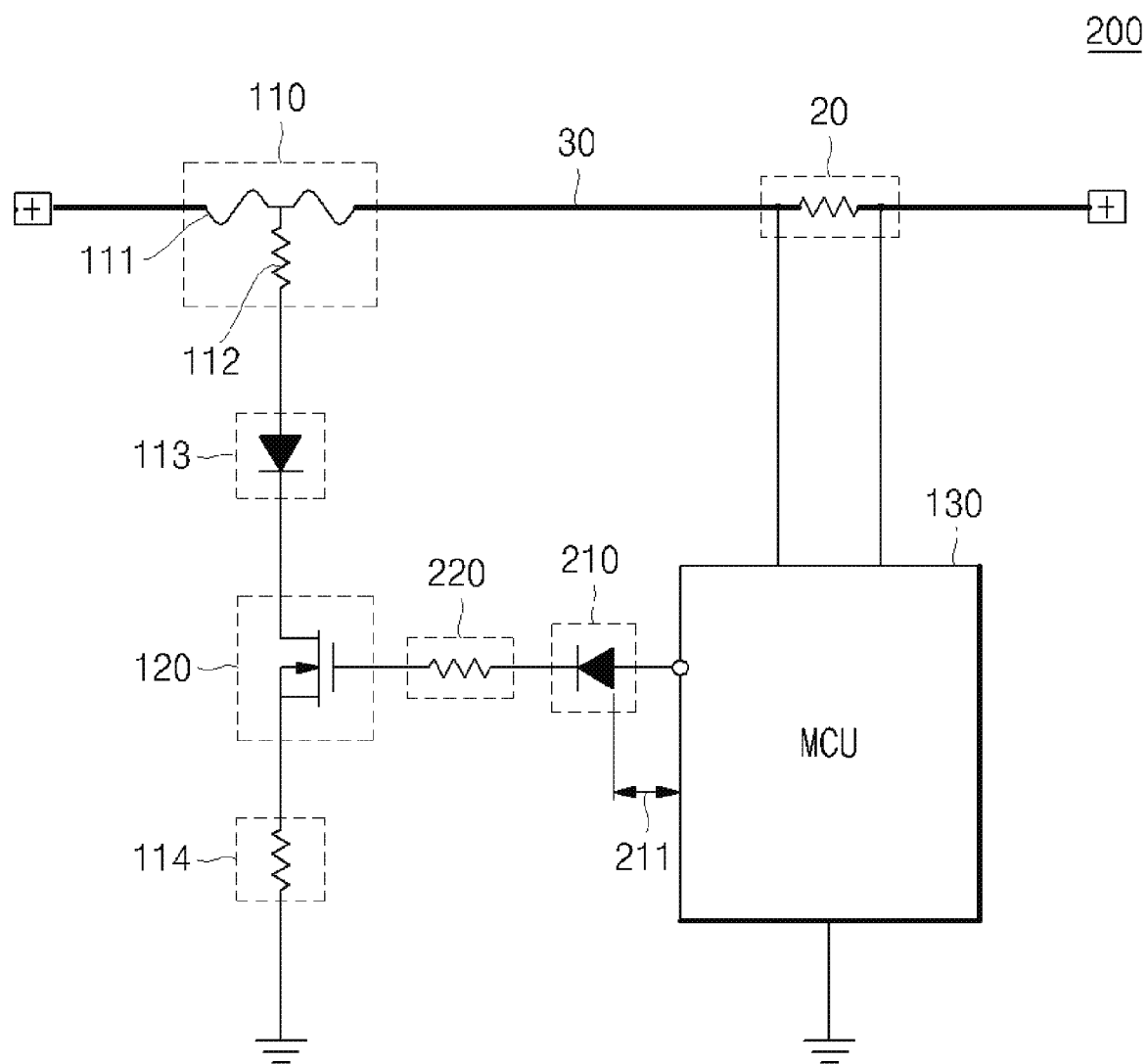
FIG. 2 is a circuit diagram of a safety circuit according to an aspect of the invention.

FIG. 2 is a circuit diagram of a safety circuit according to an aspect of the invention. Referring to FIG. 2, a safety circuit 200 includes a thermal fuse 110, a switching element 120, a microcontroller (MCU) 130, and a noise preventing diode 210. The thermal fuse 110, the switching element 120, and the microcontroller 130 shown in FIG. 2 are the same as those shown in FIG. 1.

However, instead of the noise removing unit 140 shown in FIG. 1, the safety circuit 200 shown in FIG. 2 includes a noise preventing diode 210 electrically connecting the switching element 120 to the microcontroller 130 to allow a forward current to flow from the microcontroller 130 to the switching element 120. The noise preventing diode 210 removes noise by itself by preventing a current from flowing to the switching element 120 until an output voltage of the microcontroller 130 exceeds a threshold voltage of the noise preventing diode 210, thereby eliminating the need for a more complicated circuit to remove the noise, such as the noise removing unit 140 shown in FIG. 1. The noise preventing diode 210 may be implemented by a Schottky diode passing a low frequency band signal to remove the noise better.

A length of a printed circuit pattern 211 connecting the noise preventing diode 210 to the microcontroller 130 is preferably in the range of 0.5 to 3 mm. If the length of the printed circuit pattern 211 is greater than 3 mm, the printed circuit pattern 211 can act as an antenna and receive an external RF signal, such as an RF signal transmitted by a radio set operated near the safety circuit, thereby generating a noise current, which can cause the switching element 120 to turn on erroneously when it should remain off. This causes the heater 112 to heat up, which causes the thermal fuse 110 to open and interrupt the main electric current path 30. On the other hand, if the length of the printed circuit pattern 211 is smaller than 0.5 mm to prevent the printed circuit pattern from acting as an antenna, the noise preventing diode 210 will be very close to a terminal of the microcontroller 130, making it difficult to electrically connect the noise preventing diode 210 to the microcontroller 130.

A damping resistor 220 electrically connects the switching element 120 to the noise preventing diode 210. When an RF signal is transmitted from the radio set operated near the printed circuit pattern 211, the damping resistor 220 damps the noise current generated in the printed circuit pattern 211 by reception of the RF signal, thereby preventing the switching element 120 from turning on erroneously.

The damping resistor 220 preferably has a power consumption in the range of $\frac{1}{2}$ to $\frac{1}{16}$ W. When an RF signal is transmitted from a radio set having a transmission output of 4 W operating near the noise preventing diode 210, the microcontroller 130, and the noise removing unit 140, the damping resistor 220 having the power consumption in the range of $\frac{1}{2}$ to $\frac{1}{16}$ W is effective to damp the noise current generated in the printed circuit pattern 211 by reception of the RF signal. Experiments were conducted with radio sets operating in the UHF and VHF frequency bands, and the damping resistor 220 successfully damped the noise current generated in the printed circuit pattern 211 by RF signals in a range of 400 to 470 MHz.

Figure 3:
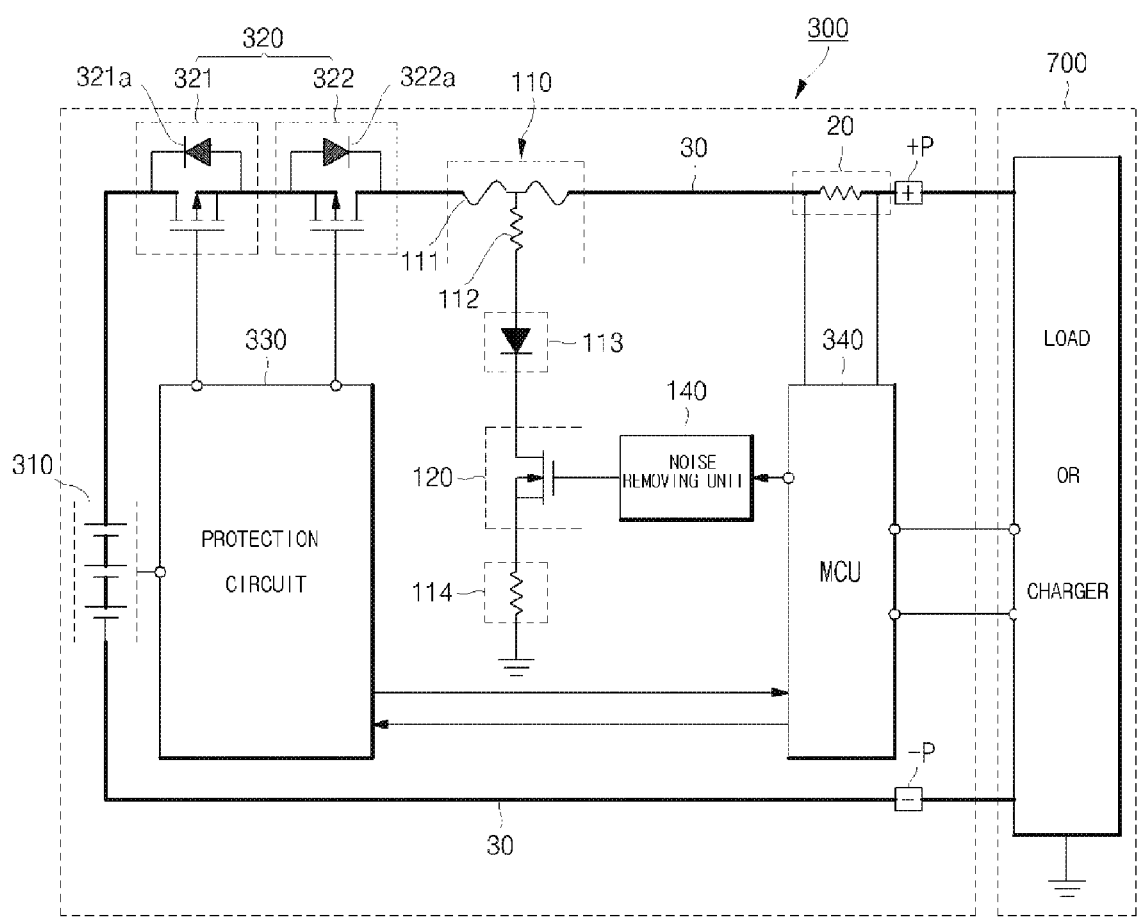
FIG. 3 is a circuit diagram of a battery pack according to an aspect of the invention.

FIG. 3 is a circuit diagram of a battery pack according to an aspect of the invention. Referring to FIG. 3, a battery pack 300 including a safety circuit includes a rechargeable battery 310, a charging/discharging direction switching unit 320, a thermal fuse 110, a switching element 120, a protection circuit 330, a microcontroller (MCU) 340, and a noise removing unit 140. The battery pack 300 is connected to a load or charger 700 so that the battery pack 300 is connected to the load 700 during a discharging operation, and is connected to the charger 700 during a charging operation.

The battery 310 is a rechargeable battery, and includes one battery cell, or a plurality of battery cells connected in series and/or parallel. The battery 310 may be a lithium polymer battery, or a lithium ion battery, or any other suitable type of rechargeable battery, and may be packaged as a prismatic type battery in which an electrode assembly is sealed in a metal can, or a pouch type battery in which the electrode assembly is sealed in a pouch, or in any other suitable type of battery package.

The charging/discharging direction switching unit 320 is electrically connected in a main current path 30 of the battery to set a charging/discharging direction of the main current path 30. A charging direction is from right to left in the main current path 30 so that current flows from the charger 700 to the battery 310 during a charging operation, and a discharging direction is from left to right in the main current path 30 so that current flows from the battery 310 to the load 700 during a discharging operation. These charging and discharging directions are applicable when the anode and the cathode of the battery 310 are oriented as shown in FIG. 3, and will be in the opposite directions if the anode and the cathode of the battery 310 are oriented in the opposite direction to that shown in FIG. 3. The charging/discharging direction switching unit 320 includes a switching element 321 for discharging and a switching element 322 for charging, each of which may be implemented by a field-effect transistor, such as an N-channel MOSFET as shown in FIG. 3, or a P-channel type MOSFET, or any other suitable field-effect transistor. The charging/discharging direction switching unit 320 further includes a parasitic or internal diode 321a is electrically connected between a source and a drain of the switching element 321 for discharging to allow a only charging current flowing from right to left in the main current path 30 to bypass the switching element 321 for discharging when the switching element 321 for discharging is turned off. The charging/discharging direction switching unit 320 further includes a parasitic or internal diode 322a electrically connected between a source and a drain of the switching element 322 for charging to allow a only discharging current flowing from left to right in the main current path 30 to bypass the switching element 322 for charging when the switching element 322 for charging is turned off.

The thermal fuse 110 is electrically connected in the main current path 30 of the battery pack 300. Since the thermal fuse 110 has the same function and constitution as the thermal fuse 110 shown in FIG. 1, a detailed description of the thermal fuse 110 will be omitted.

The switching element 120 is electrically connected to the thermal fuse 110 to cause the thermal fuse 110, to interrupt the main current path 30 when the switching element is turned on. Since the switching element 120 has the same function and constitution as the switching element 120 shown in FIG. 1, a detailed description of the switching element 120 will be omitted.

The protection circuit 330 is electrically connected to the battery 310 to measure a voltage of the battery 310, and is electrically connected to the charging/discharging direction switching unit 320 to turn on or off the switching element 321 for discharging and the switching element 322 for charging according to a charging/discharging condition of the battery 310 determined based on the measured voltage of the battery 310. When the protection circuit detects overcharging or overdischarging of the battery 310, the protection circuit 330 turns off the switching element 321 for discharging and the switching element 322 for charging to interrupt an electric current flowing in the main current path 30, thereby protecting the battery 310 from damage. The protection circuit 330 may transmit the measured voltage of the battery 310, operating states of the switching 321 for discharging and the switching element 322 for charging, and operating conditions of the protection circuit 330 to the microcontroller 340.

The microcontroller 340 is electrically connected to the protection circuit 330 to receive the measured voltage of the battery 310, the operating states of the switching 321 for discharging and the switching element 322 for charging, and the operating conditions of the protection circuit 330 from the protection circuit 330, is electrically connected to the main current path 30 to measure an electric current flowing in the main current path 30, and is electrically connected to the switching element 120 to turn on the switching element 120. The electric current flowing in the main current path 30 may be measured using the sensing resistor 20. Specifically, the microcontroller 340 is electrically connected to the sensing resistor 20 electrically connected in the main current path 30 to measure a voltage across the sensing resistor 20, calculate the electric current flowing in the main current path 30 by dividing the voltage across the sensing resistor 20 by a resistance of the sensing resistor 20. When the microcontroller detects an overcurrent flowing in the main current path 30, the microcontroller outputs an ON signal to the switching element 120 to turn the switching element 120 on and cause the thermal fuse 110 to interrupt the overcurrent flowing in the main current path 30. The microcontroller 340 is electrically connected to the protection circuit 330 to enable the protection circuit 330 to read the operating states of the switching element 321 for discharging and the switching element 322 for charging, and detect improper and dangerous operating states of the switching element 321 for discharging and the switching element 322 for charging, such as always maintaining an ON state, etc., that may occur if the switching element 321 for discharging and the switching element 322 for charging are not being controlled properly by the protection circuit 330. When such improper or dangerous states are detected, the microcontroller 340 may output the ON signal to the switching element 120 to turn the switching element 120 on and cause the thermal fuse 110 to interrupt the main current path 30. The microcontroller 340 may include a communication function to enable the microcontroller 340 to transmit condition information of the battery 310 through a data line to an external device, such as an electric power management system of a portable electronic device.

The noise removing unit 140 electrically connects the microcontroller 340 the switching element 120. The noise removing unit 140 removes noise in a signal outputted from the microcontroller 340 and noise current generated by the printed circuit pattern electrically connected to the switching element 120 and the microcontroller 340 acting as an antenna and receiving an RF signal transmitted by a radio set operating near the battery pack 300 to prevent the noise from interfering with the operation of the switching element 120 or causing the switching element 120 to turn on erroneously when it should remain off. The protection circuit 330 outputs control signals to the charging/discharging direction switching unit 320 to control the charging/discharging direction switching unit 320 to prevent a surge voltage and an impulse current generated during an ON operation or an OFF operation from flowing through the switching element 120. When the microcontroller 340 receives a signal from or outputs a signal to the protection circuit 330, the sensing resistor 20, and the load or charger 700, or when a central processing unit of the microcontroller 340 executes an internal operation such as a processing function, etc., the noise removing unit 140 prevents a small signal noise current generated by the microcontroller 340 from flowing from the microcontroller 130 to the switching element 120. Since the noise removing unit 140 has the same function and constitution as the noise removing unit 140 shown in FIG. 1, a detailed description of the noise removing unit 140 will be omitted.

The thermal fuse 110 includes the fuse 111 and the heater 112 to heat the fuse 111. When the switching element 120 is turned on, the heater 112 is heated by an electric current flowing in the heater 112, thereby heating the fuse 111 until it opens, either by melting or by increasing its internal resistance to a substantially infinite value. The thermal fuse 110 interrupts the electric current flowing in the main current path 30 to exit from of a dangerous state, such as overcharging or overheating of the battery 310, by the opening of the fuse 111 caused by the heating of the heater 112. Since the thermal fuse 110 has the same function and constitution as the thermal fuse 110 shown in FIG. 1, a detailed description of the thermal fuse 110 will be omitted.

The diode 113 for preventing the reverse current electrically connects the switching element 120 to the heater 112 to allow a forward current to flow from the heater 112 to the switching element 120. The diode 113 for preventing the reverse current prevents a current from flowing from the switching element 120 to prevent improper operation of the heater 112. Since the diode 113 has the same function and constitution as the diode 113 shown in FIG. 1, a detailed description of the diode 113 will be omitted.

The switching element 120 may be implemented by a field-effect transistor, a bipolar transistor, or any other suitable switching element. When the switching element 120 is implemented by a field-effect transistor, such as an N-channel MOSFET as shown in FIG. 1, or any other suitable field-effect transistor, a drain of the switching element is electrically connected to the heater 112 through the diode 113, a gate of the switching element 120 is electrically connected to microcontroller 340 through the noise removing unit 140, and a source of the switching element 120 is electrically connected to ground through the resistor 114 that controls an amount of the electric current flowing through the heater 112 and the switching unit 120 as described above with respect to FIG. 1. Since the switching element 120 and the resistor 114 have the same function and constitution as the switching element 120 and the resistor 114 shown in FIG. 1, a detailed description of the switching element 120 and the resistor 114 will be omitted.

Figure 4:
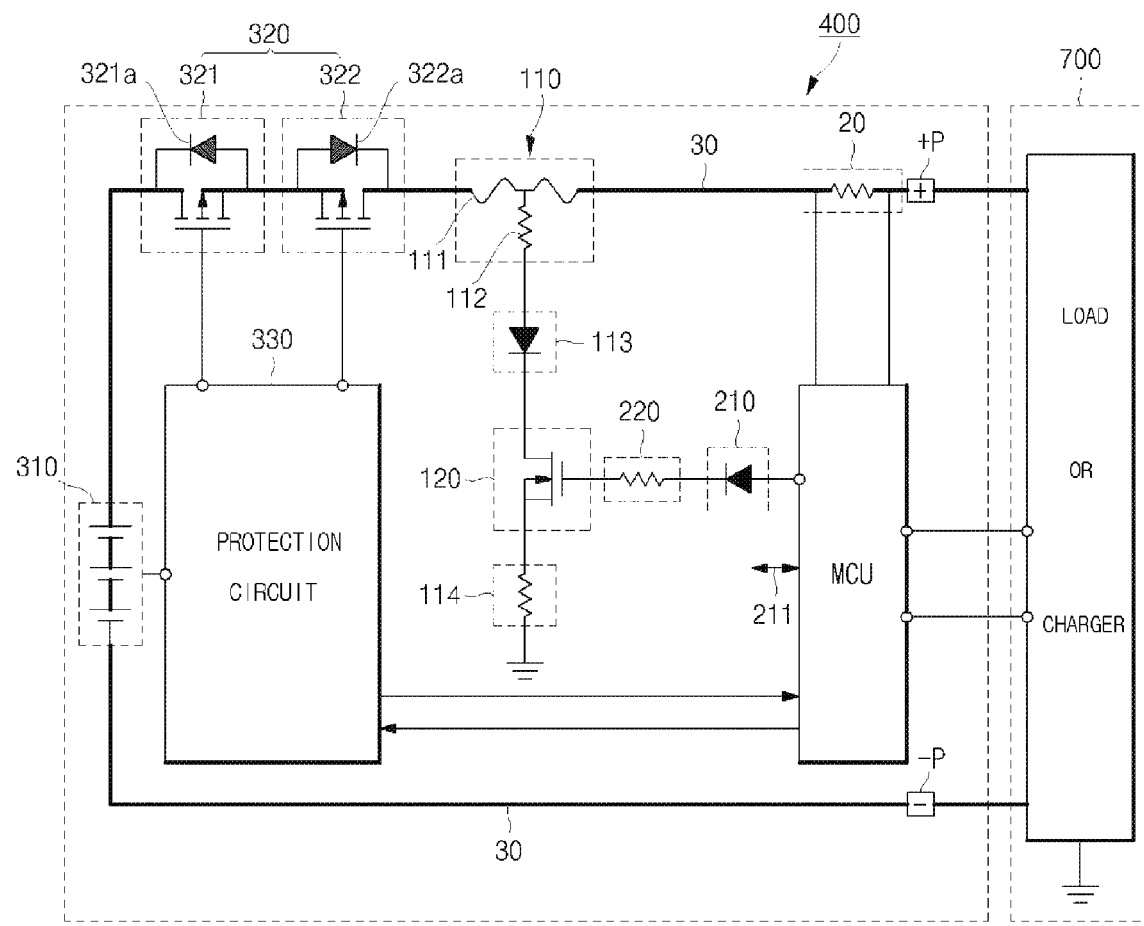
FIG. 4 is a circuit diagram of a battery pack according to an aspect of the invention.

FIG. 4 is a circuit diagram of a battery pack according to an aspect of the invention. Referring to FIG. 4, a battery pack 400 including a safety circuit includes a rechargeable battery 310, a charging/discharging direction switching unit 320, a thermal fuse 110, a switching element 120, a protection circuit 330, a microcontroller (MCU) 340, and a noise preventing diode 210. The battery pack 400 is connected to a load or charger 700 so that the battery pack 400 is connected to the load 700 during a discharging operation, and is connected to the charger 700 during a charging operation. The rechargeable battery 310, the charging/discharging direction switching unit 320, the thermal fuse 110, the switching element 120, the protection circuit 330, the microcontroller 340, and the load or charger 700 are the same as those shown in FIG. 3.

The noise preventing diode 210 electrically connects the switching element 120 to the microcontroller 340 to allow a forward current to flow from the microcontroller 340 to the switching element 120. The microcontroller 340 outputs a signal to turn the switching element 120 on to cause the thermal fuse 110 to open and interrupt the current flowing in the main current path 30 when the battery pack 400 is operating in an unstable state, such as overheating, overcharging, overdischarging, etc., or when there is an abnormal state, such as an electrical short, etc., in the charging/discharging direction switching unit 320. Accordingly, the noise preventing diode 210 blocks a noise current in the signal outputted from the microcontroller 340 to prevent an erroneous operation of the switching unit 120. When an RF signal is transmitted from a radio set operating near the battery pack 400, and the printed circuit pattern electrically connecting the noise preventing diode 210 to the microcontroller 340 functions as an antenna to receive the RF signal and generate the noise current, the noise preventing diode 210 blocks the noise current to prevent the noise current from erroneously turning on the switching element 120 and erroneously causing the thermal fuse 110 to open and interrupt the current flowing in the main current path 30. The noise preventing diode 210 may be implemented by a Schottky diode to block a noise current having a high frequency. Thus, the noise preventing diode 210 prevents an RF signal from causing the thermal fuse 100 to open erroneously and rendering the battery pack 400 unusable.

A length of the printed circuit pattern 211 electrically connecting the noise preventing diode 210 to the microcontroller 340 is preferably in the range of 0.5 to 3 mm. Since the preferred length of the printed circuit pattern 211 is described above in connection with FIG. 2, a detailed description thereof will be omitted.

The damping resistor 220 electrically connects the switching element 120 to the noise preventing diode 210. When an RF signal is transmitted from the radio set operating near the battery pack 400, the damping resistor 220 damps the noise current that is generated by the printed circuit pattern 211 acting as an antenna and receiving the RF signal, thereby preventing the noise current from erroneously turning the switching element 120 on.

The damping resistor preferably has a power consumption in the range of ½ to ¹⁄₁₆ W. When an RF signal is transmitted from a radio set having transmission output of 4 W operating near the battery pack 400, the damping resistor 220 having the power consumption in the range of ½ to ¹⁄₁₆ W is effective to damp the noise current generated in the printed circuit pattern 211 by reception of the RF signal.

The safety circuit or the battery pack including the safety circuit according aspects of the invention produces the following effects.

First, the safety circuit prevents overheating and explosion of an electronic device by interrupting the main current path of the electronic device.

Second, the safety circuit prevents the switching element from erroneously turning on and causing the thermal fuse to erroneously open and interrupt the main current path due to noise generated in the circuit for operating the switching element, and noise generated by the printed circuit pattern acting as an antenna and receiving the RF signal transmitted by the radio set operating near the safety circuit.

Third, the battery pack including the safety circuit prevents overheating and explosion of the battery pack during charging and discharging by interrupting the charging and discharging current path of the battery pack when overcharging or overdischarging is detected.

Fourth, the battery pack including the safety circuit is able to perform charging and discharging of the battery reliably because the safety circuit prevents the switching element from erroneously turning on and causing the thermal fuse to erroneously open and interrupt the main current path due to noise generated in the circuit for operating the switching element, and noise generated by the printed circuit pattern acting as an antenna and receiving the RF signal transmitted by the radio set operating near the battery pack.

Although several embodiments of the invention have been shown and described, it would be appreciated be understood by those skilled in the art that changes may be made in these embodiments without departing from the principles and spirit of the invention, the scope of which is defined in the claims and their equivalents. Therefore, it understood that the various embodiments described above are for purposes of illustration only, and are not to be construed as limiting the invention in any way.

What is claimed is:

1. A safety circuit comprising:
a thermal fuse electrically connected in a main current path so that an electric current flowing in the main current path flows through the thermal fuse;
a switching element electrically connected to the thermal fuse to cause the thermal fuse to open and interrupt the electric current flowing in the main current path when the switching element is turned on;
a microcontroller electrically connected to the switching element and the main current path to turn on the switching element when an overcurrent flows in the main current path; and
a noise removing unit electrically connecting the microcontroller to the switching element.

2. The safety circuit of claim 1, wherein:
the thermal fuse comprises:
a fuse electrically connected in the main current path so that the electric current flowing in the main current path flows through the fuse; and
a heater to heat the fuse when a heater electric current flows through the heater; and
the switching element is electrically connected to the heater to cause the heater electric current to flow through the heater when the switching element is turned on.

3. The safety circuit of claim 1, further comprising a diode electrically connecting the switching element to the thermal fuse to enable a forward current to flow from the thermal fuse to the switching element, and to prevent a reverse current from flowing from the switching element to the thermal fuse.

4. The safety circuit of claim 1, wherein the switching element is a field-effect transistor.

5. The pack type battery of claim 4, further comprising a resistor electrically connecting a source of the field-effect transistor to ground to control an amount of electric current flowing through the field-effect transistor to ground.

6. The safety circuit of claim 1, wherein the noise removing unit comprises a noise preventing diode electrically connecting the switching element to the microcontroller to enable a forward current to flow from the microcontroller to the switching element, and to prevent a reverse current from flowing from the switching element to the microcontroller.

7. The safety circuit of claim 6, wherein the noise preventing diode is a Schottky diode.

8. The safety circuit of claim 6, wherein a length of a printed circuit pattern electrically connecting the noise preventing diode to the microcontroller is in a range of 0.5 to 3 mm.

9. The safety circuit of claim 6, further comprising a damping resistor electrically connecting the switching element to the noise preventing diode.

10. The safety circuit of claim 9, wherein a power consumption of the damping resistor is in a range of $\frac{1}{2}$ to $\frac{1}{16}$ W.

11. A battery pack comprising:
a rechargeable battery electrically connected to a main current path;
a charging/discharging direction switching unit electrically connected in the main current path to set a charging/discharging direction of the main current path;
a thermal fuse electrically connected in the main current path so that an electric current flowing in the main current path flows through the thermal fuse;
a switching element electrically connected to the thermal fuse to cause the thermal fuse to open and interrupt the electric current flowing in the main current path when the switching element is turned on;
a protection circuit electrically connected to the rechargeable battery to measure a voltage of the rechargeable battery, and electrically connected to the charging/discharging direction switching unit to control the charging/discharging direction switching unit to set the charging/discharging direction of the main current path, wherein the protection circuit outputs signals providing information about the measured voltage of the rechargeable battery and information about operating conditions of the protection circuit;
a microcontroller electrically connected to the protection circuit to receive the signals providing information about the measured voltage of the rechargeable battery and the operating conditions of the protection circuit outputted from the protection circuit, electrically connected to the main current path to measure an amount of the electric current flowing in the main current path, and electrically connected to the switching element to turn on the switching element when an overcurrent flows in the main current path; and
a noise removing unit electrically connecting the microcontroller to the switching element.

12. The battery pack of claim 11, wherein:
the thermal fuse comprises:
a fuse electrically connected in the main current path so that the electric current flowing in the main current path flows through the fuse; and
a heater to heat the fuse when a heater electric current flows through the heater; and
the switching element is connected to the heater to cause the heater electric current to flow through the heater when the switching element is turned on.

13. The battery pack of claim 11, further comprising a diode electrically connecting the switching element to the thermal fuse to enable a forward current to flow from the thermal fuse to the switching element, and to prevent a reverse current from flowing from the switching element to the thermal fuse.

14. The battery pack of claim 11, wherein the switching element is a field-effect transistor.

15. The battery pack of claim 14, further comprising a resistor electrically connecting a source of the field-effect transistor to ground to control an amount of electric current flowing through the field-effect transistor to ground.

16. The battery pack of claim 11, wherein the noise removing unit comprises a noise preventing diode electrically connecting the switching element to the microcontroller to enable a forward current to flow from the microcontroller to the switching element, and to prevent a reverse current from flowing from the switching element to the microcontroller.

17. The battery pack of claim 16, wherein the noise preventing diode is a Schottky diode.

18. The battery pack of claim 16, wherein a length of a printed circuit pattern electrically connecting the noise preventing diode to the microcontroller is in a range of 0.5 to 3 mm.

19. The battery pack of claim 16, further comprising a damping resistor electrically connecting the switching element the noise preventing diode.

20. The battery pack of claim 19, wherein a power consumption of the damping resistor is in a range of ½ to ¹⁄₁₆ W.

* * * * *

UNITED STATES PATENT AND TRADEMARK OFFICE
CERTIFICATE OF CORRECTION

PATENT NO. : 8,049,469 B2  Page 1 of 1
APPLICATION NO. : 12/237632
DATED : November 1, 2011
INVENTOR(S) : Youngbok Kim It is certified that error appears in the above-identified patent and that said Letters Patent is hereby corrected as shown below:

Column 14, Claim 19, line 7.    After "element"

Insert -- to --

Signed and Sealed this
Twenty-third Day of October, 2012

David J. Kappos
*Director of the United States Patent and Trademark Office*